INVENTOR
KARL AXEL LUNDKVIST
BY Hane and Baxley
ATTORNEYS

Aug. 5, 1969 K. A. LUNDKVIST 3,460,076

CROSSBAR SWITCHING DEVICE FOR USE IN AUTOMATIC TELEPHONE SYSTEMS

Filed Dec. 6, 1967 3 Sheets-Sheet 2

INVENTOR
KARL AXEL LUNDKVIST
BY Hane and Baxley
ATTORNEYS

INVENTOR
KARL AXEL LUNDKVIST
BY Hane and Baxley
ATTORNEYS

United States Patent Office 3,460,076
Patented Aug. 5, 1969

3,460,076

CROSSBAR SWITCHING DEVICE FOR USE IN AUTOMATIC TELEPHONE SYSTEMS

Karl Axel Lundkvist, Banergatan 42, Stockholm Sweden

Filed Dec. 6, 1967, Ser. No. 688,553
Int. Cl. H01h *67/14*
U.S. Cl. 335—112 3 Claims

ABSTRACT OF THE DISCLOSURE

A crossbar switching device in which a multiple including a plurality of sets of flexible conductors is mounted on a frame structure in mutually parallel and coplanar relationship and a selecting bar for each of the said sets of conductors is mounted on the frame structure parallel to the plane of the conductors. A plurality of switching means is also mounted on the frame structure adjacent to the multiple and the selecting bar. Each of the switch means includes an operating bar disposed crosswise of the conductors and the selecting bars, an electromagnet for actuating the respective operating bar, a set of contact springs for each set of conductors in the multiple. Insulation blocks, that is one for each set of contact springs, support one end of the springs, the free ends of the springs protruding between the conductors.

This invention relates to a switching means for an automatic telephone system of the crossbar or co-ordinate type. On the basis of traffic calculations a normal selecting stage in such a system should have two or three switching stages using switches with a selecting capacity of about 20 or 25 lines. With the help of markers one switch in each switching stage is simultaneously selected and operated and the two or three switches are so selected that they can be connected together to constitute a telephone connection. In order to get short holding times for the markers the operating time of the switches must be short. Switches with large magnets or many steps for operation are not acceptable. The setting of the crossbar switch takes place in one or two steps, namely selection and operation of a contact spring set in the switch.

In order to reduce the number of selecting magnets and selecting fingers in a crossbar switch the contact spring sets in a conventional crossbar switch comprise contact springs for two or more lines which are connected simultaneously and must be separated with the help of extra selecting means and extra contact spring sets. Operating bars with stories, however, require twice as many contacts in each communication than if switches without stories are used. The advantage obtained by the use of stories namely a reduced number of selecting means is almost lost by the need for said extra selecting means and said extra contact spring sets. The most important factor is however that the operating magnets will be larger, more expensive and slow-acting if the contact spring sets are arranged in stories.

In a conventional crossbar switch the contact springs are part of the multiple and increase the capacity between adjacent pairs of speech wires unduly, so that the multiple is sensitive to cross-talk. Moreover, a number of operating bars, usually ten, form a switch unit in which all contact spring sets are connected by hand.

It is an object of this invention to provide a switching means that is free from cross-talk and in which each switch or operating bar is a separately detachable unit, simple to manufacture as a numerous component, and that has small, quick-acting electromagnets. The most simple multiple is an open wire multiple. The multiple conductors are suitably arranged vertically in one vertical plane and the wires which belong to the same line form a set of conductors arranged adjacent to one another. The switches are stacked in front of the multiple which thus can be made of contact silver wires fixed in a frame. Each switch comprises a base plate, a horizontal operating bar with an operating magnet and one contact spring set with a driver and a selecting finger at each crossing point between the operating bar and the sets of line conductors in the multiple. The length of the multiple wires depends on the number of switches and the number of switches depends on the traffic on the lines in the multiple. In a frame containing a large number of switches the switches may form groups and each group of switches has a separate multiple. For this purpose, some of the switches are replaced by a base plate carrying strips with two rows of contacts to which the vertical wires can be soldered at two points and cut between said soldering points. In said two rows of contacts, wires for two different multiples terminate. It is a question of space that each operating bar forms a separately detachably switch because each point in the switch must be accessible not only during manufacturing but also when installed for maintenance and inspection. Two problems are involved, namely, to provide a fixed space between switch contacts and multiple conductors, and to couple the selecting fingers to the selecting bars. The switch should have the same position when installed as it has when taken out for testing or inspection, that is, it should have a horizontal base plate.

The invention will be described with reference to the enclosed drawings in which.

Figure 1:
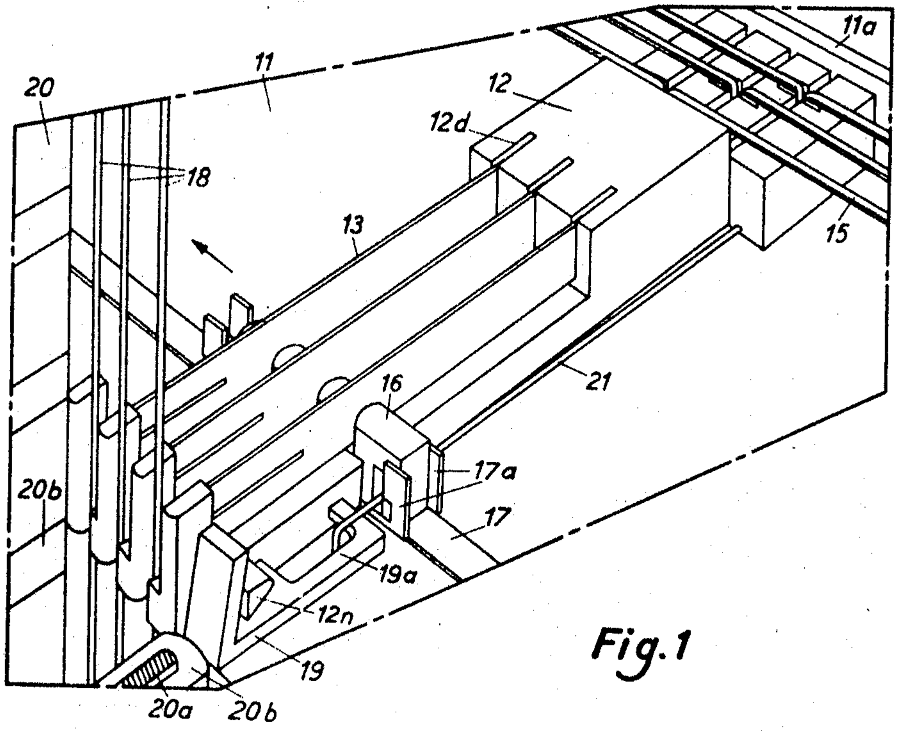
FIG. 1 shows a contact spring set and its selecting means.
Figure 2:
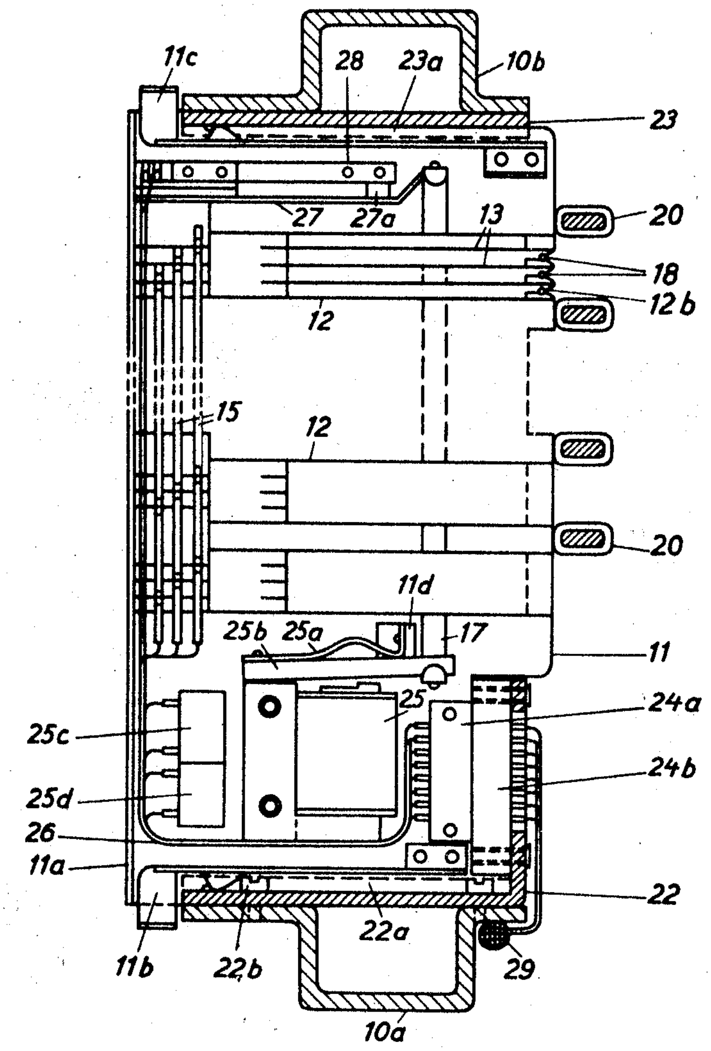
FIG. 2 shows a switch or operating bar placed in a frame.
Figure 3:
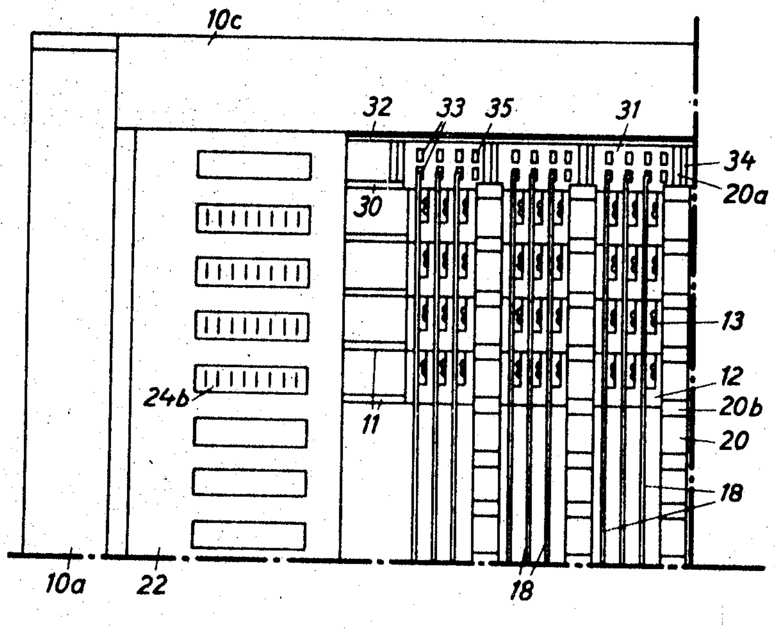
FIG. 3 shows part of a multiple for a number of switches.

In FIG. 1 a base plate 11 of a switch or operating bar is shown, on which base plate a number of strips 12 of insulation blocks or insulating material are fixed. The back edge 11*a* of the base plate 11 is turned up in order to stiffen the plate. Each strip 12 supports three contact springs 13 which are connected to each one of three horizontal conductors 15, and a driver 16 of insulating material for actuation of the contact springs 13. The driver 16 slides in grooves in the sides of the strip 12 and is actuated by a selecting finger 21 that is fixed to the back part of the strip 12. The base plate 11 supports further an operating bar 17 having flanges 17*a* for the operation of the selecting fingers 21, and an armature 19 for each selecting finger 21. In FIGS. 1–3 vertical multiple conductors 18 for coaction with the contact springs 13 are shown as well as vertical selecting bars 20, each comprising a core 20*a* of magnetic material with pole pieces 20*b* and a coil wound on said core between said pole pieces.

The armature 19 has a lever 19*a* and is held by the respective selecting finger 21 which presses the lever 19*a* against the base plate 11, and by a projection 12*a* on the respective strip 12. The armature 19 rests on the base plate 11 and is attracted against the selecting bar 20 when the same is energized, whereby the selecting finger 21 is lifted. Laterally the armature 19 is guided by the sides of the strips 12.

The flanges 17*a* on the operating bar 17 have at the lower end a groove for the selecting finger 21, so that the operating bar can be displaced in the direction of the arrow without actuating the selecting finger 21, as long as the selecting finger is not lifted by the armature 19. If the armature 19 lifts a selecting finger, when the operating bar 17 is in the idle position shown in FIG. 1, and thereafter the operating bar is displaced in the direction of the arrow, the respective selecting finger is squeezed tight between the flanges 17*a* and the driver 16. The driver 16 follows the operating bar and actuates the contact springs 13, so that the contact springs are pressed against and make contact with the multiple conductors 18. When the operating bar 17 returns to its rest position and the bar 20 is not energized, the selecting finger 21 and the armature 19 also return to their rest positions according to FIG. 1.

Figure 4:
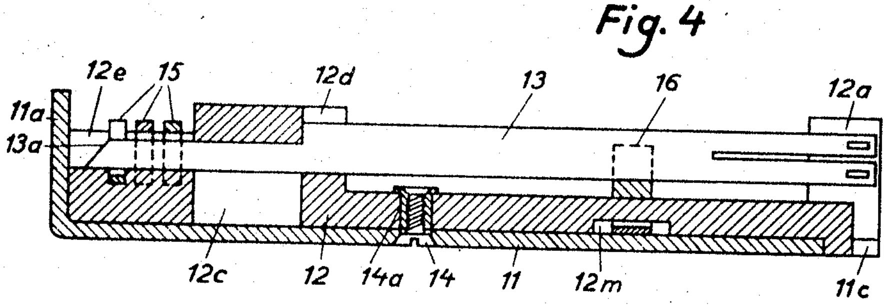
FIG. 4 shows a strip (or part of a strip) holding a contact spring set.
Figure 5:
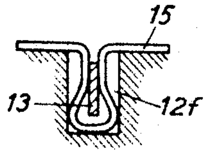
FIGS. 5–6 show details in a switch.

As is shown in FIG. 4 the strips 12 are fixed to the base plate 11 by screws 14 and threaded sleeves 14*a* which extend through holes 11*c* in the base plate 11. Each strip 12 has a groove 12*m* for the operating bar 17. The strips 12 may be molded separately or in groups, that is, in one unit or in two complementary pieces, one front piece and one back piece. The contact springs can be secured in the strips 12, but as shown in FIG. 4 are inserted into grooves in the strip 12. These grooves 12*d*, 12*c* and 12*e* for each contact spring together define an elongate hole through the strip in the longitudinal direction of the contact spring. The back part 13*a* of the contact spring 13 is pointed and pushed in through said hole. The grooves 12*e* are widened at 12*f* as shown in FIG. 5, where a contact spring is to be soldered to one of the crossing conductors 15. According to FIG. 5 the conductor 15 is bent down into the widened groove portion 12*f* and clasps the contact spring 13 when the same is pushed through the groove 12*e*, so that mechanical contact is achieved as with a plug and jack connection. The contact is secured by soldering so that the contact spring 13 is fixed to the strip 12.

In FIG. 4 one of the flanges 12*a* is shown which according to the invention protrudes between the flexible conductors 18 in FIG. 1. The free end of each contact spring 13 rests against said flanges 12*a* when not actuated. At each flange 12*a* there is a groove 12*b* (FIG. 2) and at 11*c* (FIG. 4) in which a conductor 18 is held so that there is a fixed distance between the conductor and the corresponding contact spring in rest position.

Figure 6:
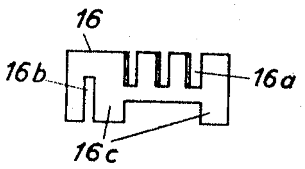

FIG. 6 shows a driver 16 made of insulating material which has grooves 16*a* for the contact springs 13 and a groove 16*b* for the selecting finger 21. Lugs 16*c* on the driver slide in above mentioned grooves in the sides of the strip 12 when the driver actuates the contact springs 13.

In FIG. 2, a frame including members 10*a* and 10*b* mounts a selecting means according to the invention. The inside of the frame has secured thereto two molded plates 22 and 23 respectively, with flanges 22*a*, 23*a* on which the base plate 11 of the switches rest. The plates 22 and 23 are fixed to the frame members 10*a*, 10*b* with screws 22*b*. The plate 22 is an angle plate and supports a block of jacks 24*b* for coaction with plugs 24*a* on the switches.

The base plate 11, in addition to the turned-up edge 11*a*, is formed with a lug 11*d* and two lock springs 11*b*, 11*c* which hold the switches when mounted in the frame. On the base plate 11, a number of contact spring assemblies 13, for instance twenty, are arranged together with an operating magnet 25, an armature 25*b* of which is held by a spring 25*a* fixed to the lug 11*d*, and with the operating bar 17 which extends between said armature 25*b* and a spring 27.

On the base plate 11 there are further mounted the plugs 24*a* as well as an additional contact spring set 28 which is actuated by the spring 27 when the operating bar 17 is actuated by the magnet 25. The contact springs in the spring assemblies 12 and 28 are connected together and with the plugs 24*a* through conductors 15 and a cable 26. Spark quenching means 25*c* and a place for for instance a rectifier 25*d* are shown. A plate 27*a* of insulating material is displaced under the spring set 28 to operate the spring set, when the spring 27 moves in the plane of the base plate.

A cable 29 for terminals is shown in the drawing, FIG. 2. For each contact spring assembly 13 in a switch there are three corresponding multiple conductors 18 and one magnetic bar 20 as described above and shown in FIG. 1.

FIG. 3 shows the selecting means seen from the multiple side. In the frame, of which the vertical side 10*a* and a side plate 22 and a top portion 10*c* are shown in the figure, base plates 11 for switches as well as base plates 30 for multiple conductors 18, made for instance of contact silver, are inserted. On the base plates 30 there are mounted strips 31 of insulating material with soldering tags 33 connecting the multiple conductors 18 and soldering tags 35 for the terminals of the coils of the magnetic bars 20. Base plates 30 also mount metal supports 34 for bars 20*a*. The supports 34 are secured to a metal strip 32 to stiffen the plates. FIG. 3 further shows how the strips 12 and the contact springs 13 protrude between the multiple conductors 18.

The selecting means are set and released by means of short current pulses. Rather large currents can therefore pass through the coils and the coils need, nevertheless, little space. The pull of the magnets depends on the cross-section of the magnetic cores and on the travel of the armatures. The selecting fingers need only small forces to be moved but must be moved through on adequate distance. The coils of the magnets should be currentless during the communications. This can be achieved, as is assumed in FIGS. 1–2, by residual magnetization in the core of the operating magnet 25. Current pulses having opposite direction for setting and releasing are necessary in this case.

Figure 7:
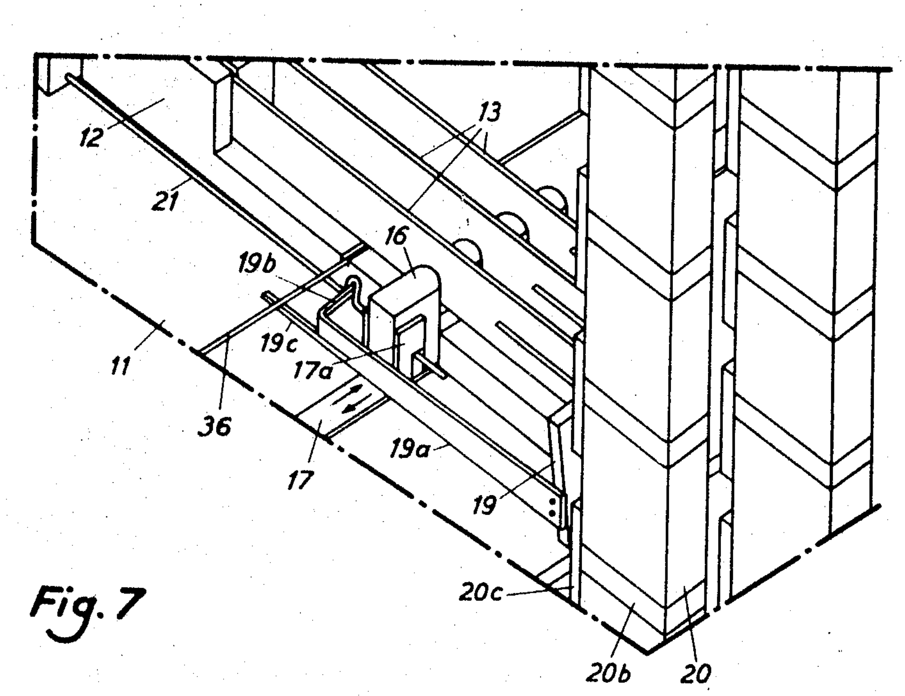
FIG. 7 shows an alternative embodiment of the selecting means of a contact spring set.

A second embodiment of the invention is shown in FIG. 7. Here it is presumed that the operating magnet is operated and thereafter releases its armature 25*b* in FIG. 2. The operating bar 17 is pulled to the left in FIG. 7 by the magnet 25 and returns thereafter to its rest position, for instance by the action of the spring 27 in FIG. 2. When a telephone connection is to be set up, the selecting bar 20 is energized. When the flanges 17*a* are moved to the left, the armature 19 of the bar is attracted and lifts the selecting finger 21. When the operating bar 17 is released, the selecting finger 21 is squeezed between the flanges 17*a* and the driver 16 which is pulled to the right in FIG. 7 and operates the contact springs 13. When the telephone connection is to be broken, the operating bar 17 is once more pulled to the left and, as the magnet 20 now is currentless, the selecting finger 21 will drop down upon the base plate 11.

A difference between FIG. 7 and FIG. 1 is that the lever 19*a* of armature 19 is longer so that the movement of the selecting finger 21 is larger, and that pole plates 20*c* are arranged on the pole pieces 20*b* in order to increase the space available on the bars 20 for coils and in order to allow wider tolerances in manufacture.

The armature 19 according to FIG. 7 is held by the selecting finger 21 which is bent to straddle an arm 196 extending from lever 19*a* so that the armature only can be moved a short distance in the direction of the lever.

In FIG. 7 it is shown the movement of the selecting fingers 21 can be controlled. A conductor 36 is placed in a groove 37 in the strips 12 and in parallel with the operating bar 17. When the contact springs 13 are to be actuated, the operating bar 17 is pulled to the left and not released until the selecting finger 21 has been lifted by the armature 19. When the armature 19 is attracted, the lever 19*a* operates the selecting finger 21 which makes contact with the conductor 36 and closes a circuit, showing that the operating bar 17 may be released. Said circuit passes through the connecting means 24*a*, 24*b* in FIG. 2 to the means for operating the selecting bar 20 and the operating magnet 25.

I claim:

1. A crossbar switching device comprising in combination:

a frame structure (10*a*, 10*b* and 10*c*);

a multiple including a plurality of sets of conductors (18) mounted in mutually parallel and co-planar relationship on said frame structure;

a selecting bar (20) for each of said sets of conductors mounted on the frame structure parallel to the plane of the conductors;

a plurality of switching means supported individually detachably on said frame structure and stacked adjacent to said multiple and said selecting bars, each of said switch means including an operating bar (17) disposed crosswise of said conductors and said selecting bars, an operating electromagnet (25) for actuating the respective operating bar (17), a set of contact springs (13) for each of said sets of conductors, insulation blocks (12) for said sets of contact springs supporting one end of the same in spaced relationship, the free ends of the springs protruding between said conductors, a driver (16) and a selecting finger (21) for each set of contact springs coupled with the respective operating bar to actuate the same for operating the respective set of contact springs and wires (15) interconnecting said sets of contact springs;

an electromagnetic means (19, 20*a* and 20*b*) for each of said selecting bars (20) coacting with the respective selecting bar to actuate the respective selecting finger (21) in response to an excitation of the respective electromagnetic means; and abutment flanges (12*a*) on said insulation blocks (12), each of the contact springs in each set being biased into abutment with the respective flange when the contact springs are at rest, the blocks having further a plurality of grooves each retaining one of said conductors (18) in a predetermined position with reference to the respective contact spring in the rest position of the latter.

2. A crossbar switching device according to claim 1 wherein each of said selecting bars (20) comprises a magnetizable core (20*a*), a coil encompassing said core and a movable armature (19) controlled by excitation of said coil and coacting with the respective selecting finger (21) for moving the same into engagement with the respective operating bar (17) to operate the same upon excitation of the respective coil.

3. A crossbar switching device according to claim 1 wherein each of said selecting bars (20) comprises a magnetizable core (20*a*) extended to cross the operating bars of all said switching means, a coil at each crossing point encompassing said core, a movable armature (19) belonging to the switching means in each crossing point controlled by excitation of said coil and coacting with the respective selecting finger (21) for moving the same into engagement with the respective operating bar (17) to operate the same upon excitation of the respective coil.

References Cited

UNITED STATES PATENTS

| | | | |
|---|---|---|---|
| 2,664,468 | 12/1953 | Montchausse | 335—112 |
| 2,718,559 | 9/1955 | Lundkvist | 335—112 |

BERNARD A. GILHEANY, Primary Examiner

H. BROOME, Assistant Examiner